Oct. 9, 1951     F. JOHN     2,570,685
TIRE CHAIN ASSEMBLY
Filed July 10, 1950
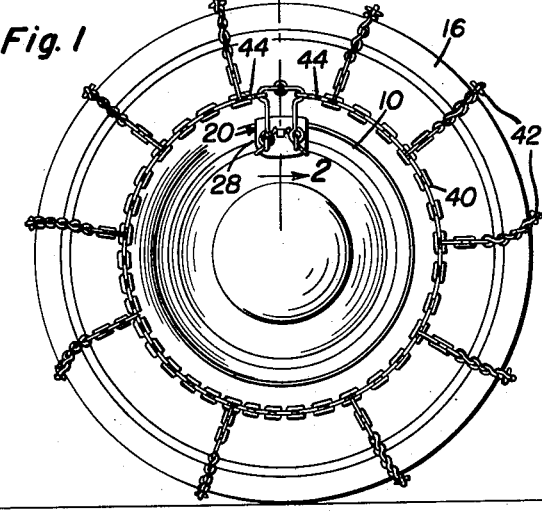
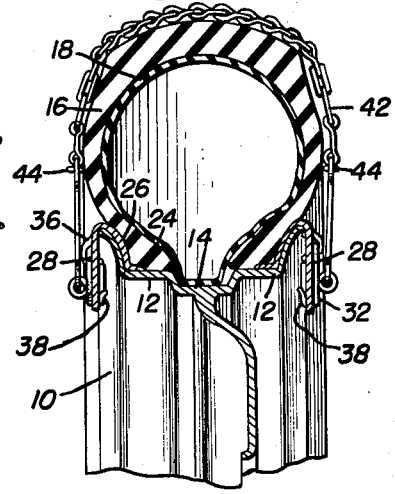
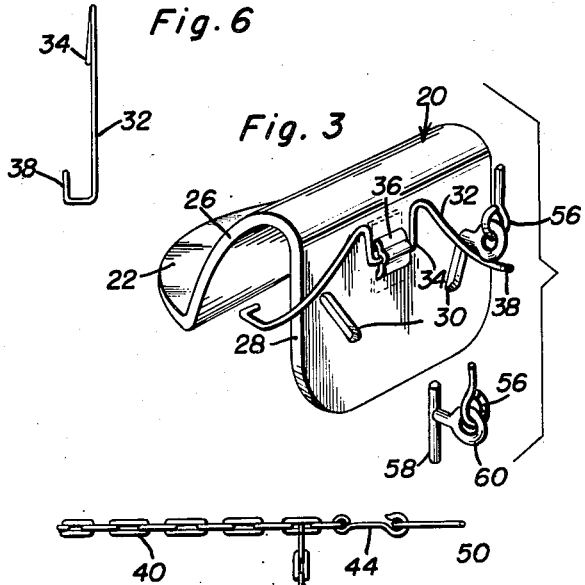
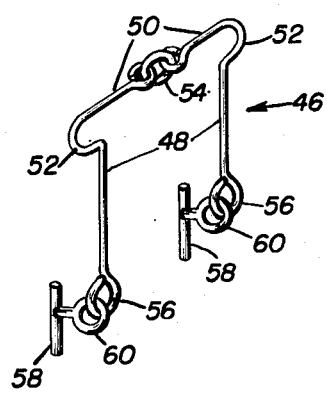
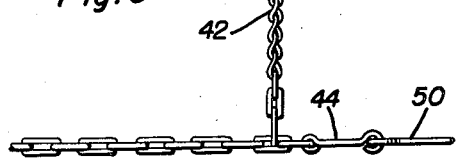
Francis John
INVENTOR.
BY *Clarence A. O'Brien*
*and Harvey B. Jacobson*
Attorneys Patented Oct. 9, 1951

2,570,685

UNITED STATES PATENT OFFICE 2,570,685

TIRE CHAIN ASSEMBLY

Francis John, Wenatchee, Wash.

Application July 10, 1950, Serial No. 172,964

5 Claims. (Cl. 152—241)

This invention relates generally to tire chains and more particularly to a tire chain assembly for use with a pneumatic tire, certain portions of the assembly being rigidly secured between the bead of the tire and the wheel rim, these portions remaining in place usually during the complete season when tire chains are likely to be needed, and these portions are, therefore, in place ready to facilitate the attachment of chains at any time during the season, although the parts which are secured between the tire and the rim may be removed during the summer or at any other season when the operator of the vehicle deems it unlikely that they will be needed.

A primary object of the invention is, therefore, to provide means for facilitating the securing of tire chains in place.

Another object of this invention is to provide attaching means on the wheels of motor vehicles, which means can remain unobtrusively in place while the tire chains are removed from the wheels.

Yet another object of this invention is to provide attachment means for tire chains which will remain on the wheels during considerable periods, yet will not likely be damaged or deformed, due to the positioning and character of the same.

Still another object of this invention is to provide means whereby tire chains can be reasonably easily secured on a tire, even when the vehicle is stalled.

Yet another object is to provide means for securing tire chains which will facilitate the tensioning of the tire chains as they are applied to the wheels.

Another object of this invention is to provide attachment means which will not ordinarily become inadvertently disconnected, even though the actual attachment operation is simple.

A last object to be mentioned specifically is to provide a device of this character which is relatively inexpensive and practicable to manufacture, which is simple, safe and convenient to use, and which will give generally efficient and durable service.

With these objects definitely in view, this invention resides in certain novel features of construction, combination and arrangement of elements and portions that will hereinafter be described in detail in the specification, particularly pointed out in the appended claims, and illustrated in the accompanying drawings which form a material part of this application, and in which:

Figure 1 is a side elevational view of a wheel with this invention operatively applied thereon;

Figure 2 is a vertical sectional view taken substantially upon the line 2—2 in Figure 1;

Figure 3 is a view, in perspective, of the part hereinafter referred to as the attachment plate, and parts closely associated therewith;

Figure 4 is another view, in perspective, of the part hereinafter referred to as the U-shaped member, with the keys carried thereby;

Figure 5 is a fragmentary plan view of a portion of the tire chain; and

Figure 6 is a side elevational view of the spring clip structure used to hold the above-mentioned keys in place.

Similar characters of reference designate similar or identical elements and portions throughout the specification and throughout the different views in the drawings.

Referring now to the drawings in detail, this invention includes a structure which is used with an environment ordinarily consisting of a rim 10 having a pair of opposed angular tire bead seats 12 and a drop center 14. The environment will also include a tire 16 and a pneumatic tube 18.

An attachment plate 20 for each side of each wheel is provided, this attachment plate being best illustrated in Figure 3 and including a flange 22 of curved periphery and adapted to fit between the tire bead 24 and the rim seat 12, while an arcuate portion 26 of the attachment plate extends outwardly to the edge of the rim 10. An integral extending portion 28 on each attachment plate 20 is disposed radially of the rim when in operative position, this extending portion 28 being at all times outside the rim. The attachment plates 20 are rigidly held in place when the tube 18 is inflated. The extending portions 28 are provided with key-receiving slots 30 which are disposed angularly as indicated best in Figure 3.

Each of the extending portions 28 carries a spring clip comprised of two arms 32 and a central bowed portion 34, which last-mentioned portion is secured by a clip 36 substantially at the center of the extending portion 28, with the arms 32 extending in diverging manner toward and beyond the slots 30. The ends of the arms 32 are preferably formed with returned portions 38 which hook around the edges of the extending portions 28, this structure preventing the spring clip from being inadvertently brushed from the attachment plate during the operation of the vehicle.

Each of the tire chains includes a pair of laterally disposed chains 40 and a plurality of spaced transverse chains 42 secured to and between the lateral chains 40, and each end of each lateral chain 40 is provided with a hook 44, this structure being more or less conventional except for the provision of the hooks 44. A U-shaped member generally indicated by the numeral 46 in Figure 4 is used to secure the ends of each lateral chain 40 to the attachment plate 20. Each U-shaped member 46 includes a pair of arms 48 having transversely disposed extensions 50 connected to the arms 48 by arcuate intermediate portions 52, and a ring 54 will be used for hingedly connecting the elements 50 together. The other ends of the arms 48 terminate in eyes 56, to which are secured keys 58 of bar form, each key being provided with an eye 60 which is connected to the eye 56 of the corresponding arms.

The slots 30 in the attachment plates 20 have already been mentioned, and it will now be noted that the eyes 56 and 60 are disposed normal to each other when the chain assembly is in place on a wheel, the keys 58 being thereby urged into positions in which the keys extend substantially radially of the wheels. The slots are disposed at angles to the keys when the same are in set position and inadvertent disconnection of the keys from the slots is thus prevented. Otherwise stated, the keys and arms have interlocking simple eyes 56 and 60 so that the keys are urged toward parallelism with said arms during operation of the device, the slots 30 being inclined sufficiently to avoid inadvertent disconnection of the keys, although still allowing easy insertion of the keys during the mounting of the tire assemblies on the wheels.

The operation of this invention will be clearly understood from a consideration of the foregoing description of the mechanical details thereof, taken in connection with the drawings and with the above recitation of the objects of this invention. In recapitulation, it might be added that the spring clips comprise means to lock the keys 58 against rattling and against undue wear during operation, the arms 32 of the spring clips urging the keys toward one end of each slot, where the keys will remain as long as the tire assembly is retained on the wheel. The U-shaped members 46 with the attached keys 58 are removed along with the tire assemblies, although the attachment plates 20 will not be removed from the wheels during the season when tire chains are likely to be used.

Having described the invention, what is claimed as new is:

1. A tire chain assembly for use with a rim of a wheel and a pneumatic tire thereon, comprising a pair of lateral chains, transverse chains secured to and extending between said lateral chains, hooks on the ends of the lateral chains, a pair of opposing plates each having a portion securable between a rim and its tire and an extending portion, and a pair of U-shaped members each engaging the hooks on the opposite ends of one of the lateral chains, the U-shaped members having arms removably secured to said extending portions of the plates.

2. A tire chain assembly for use with a rim of a wheel and a pneumatic tire thereon, comprising a pair of lateral chains, transverse chains secured to and extending between said lateral chains, hooks on the ends of the lateral chains, a pair of opposing plates each having a portion securable between a rim and its tire and an extending portion, and a pair of U-shaped members each engaging the hooks on the opposite ends of one of the lateral chains, the U-shaped members having arms removably secured to said extending portions of the plates, said extending portions having slots and said arms of the U-shaped members having keys removably securable in said slots.

3. An assembly according to claim 2 and including spring clips mounted on said extending portions and biasing said keys toward one end of each slot to prevent undue rattling and wear of the keys.

4. An assembly according to claim 2 and wherein said keys and arms have interlocking simple eyes so that said keys are urged toward parallelism with said arms during operation, and said slots are disposed angularly with respect to said keys to prevent inadvertent disconnection of the keys from the plates.

5. An assembly according to claim 2 and wherein said arms of each of the U-shaped members are pivotally secured together to facilitate insertion of the keys in the slots.

FRANCIS JOHN.

REFERENCES CITED

The following references are of record in the file of this patent:

UNITED STATES PATENTS

| Number | Name | Date |
| --- | --- | --- |
| 1,380,215 | Kleineck | May 31, 1921 |
| 1,587,980 | Nelson | June 8, 1926 |
| 2,020,586 | Stetson | Nov. 12, 1935 |
| 2,545,061 | Weber | Mar. 13, 1951 |
| 2,553,849 | Dines | May 22, 1951 |